United States Patent [19]

Svenning et al.

[11] Patent Number: 5,442,590
[45] Date of Patent: Aug. 15, 1995

[54] SEISMIC CABLE DEVICE

[75] Inventors: Bjornar Svenning, Trondheim; Eivind Berg, Ranheim, both of Norway

[73] Assignee: Den norske stats oljeselskap a.s, Stavanger, Norway

[21] Appl. No.: 848,009

[22] PCT Filed: Oct. 22, 1990

[86] PCT No.: PCT/NO90/00159

§ 371 Date: Apr. 27, 1992

§ 102(e) Date: Apr. 27, 1992

[87] PCT Pub. No.: WO91/06879

PCT Pub. Date: May 16, 1991

[30] Foreign Application Priority Data

Oct. 26, 1989 [NO] Norway .................................. 894263

[51] Int. Cl.⁶ .............................................. G01V 1/38
[52] U.S. Cl. ..................................... 367/15; 367/20; 367/154; 367/178; 367/188; 181/112; 181/122
[58] Field of Search ................ 367/15, 20, 154, 178, 367/180, 188; 181/112, 122

[56] References Cited

U.S. PATENT DOCUMENTS

| | | | |
|---|---|---|---|
| 3,332,057 | 7/1967 | Pavey, Jr. .......................... | 367/178 |
| 3,987,404 | 10/1976 | Woodruff ......................... | 340/6 R |
| 4,134,097 | 1/1979 | Cowles ............................. | 340/7 R |
| 4,163,206 | 7/1979 | Hall, Jr. ............................ | 340/17 R |
| 4,300,220 | 11/1981 | Goff et al. ......................... | 367/188 |
| 4,323,988 | 4/1982 | Will et al. ......................... | 367/4 |
| 4,405,036 | 9/1983 | Wener et al. ...................... | 181/110 |
| 4,516,227 | 5/1985 | Wener et al. ...................... | 367/15 |
| 4,870,625 | 9/1989 | Young et al. ...................... | 367/16 |
| 4,928,263 | 5/1990 | Armstrong et al. ................ | 367/118 |
| 5,142,499 | 8/1992 | Fletcher ............................ | 367/20 |

FOREIGN PATENT DOCUMENTS 1577417  10/1980  United Kingdom .......... G01V 1/20

*Primary Examiner*—J. Woodrow Eldred
*Attorney, Agent, or Firm*—Foley & Lardner

[57] ABSTRACT

The device comprises instruments for collection and recording of signals in seismic exploration of the substratum off-shore. The device is designed as a pole which is adapted to be forced down into the seabed and comprises a pointed lower end (7), an intermediate approximately cylindrically shaped main portion (6), a vibration-absorbing spacer (14) between the pointed end (7) and the intermediate main portion (6). The other end of the intermediate main portion (6) is connected to a top part (8) designed for inserting/pulling and other ways of handling the device. The pointed end (7) at least comprises geophones (15-17) and a hydrophone (23) is placed in the vicinity of the upper end of the device. The majority of the device's other instruments are placed in the intermediate main portion (6). The device is connected to a main cable (4) which extends to a seismic ship (29, 31).

5 Claims, 4 Drawing Sheets

SEISMIC CABLE DEVICE

TECHNICAL FIELD

The present invention relates to a device and a method for performance of explorations of the kind which are indicated in the preambles to the main claims. Basically the invention concerns seismic exploration of the substratum offshore where pressure waves and shear waves from the substratum are measured in response to release of pressure and/or shear wave energy.

BACKGROUND ART

Marine seismic explorations are usually carried out by a seismic cable fitted with several hydrophones being towed at a certain depth. Pressure waves are released near the cable in several ways. Usually this is carried out by means of air guns. The pressure wave energy travels down through the substratum, but parts of the pressure waves are reflected from areas where there are acoustic impedance characteristics in the substratum. The hydrophones record the reflected pressure waves in the water and transform this information into electric signals which are detected and processed on the seismic ship which tows the cable. Using this method, only reflected and/or converted shear to pressure energy is recorded. However, it is known that down in the substratum both pressure waves and shear waves are reflected. The shear waves do not travel in water and cannot therefore be detected by a hydrophone cable. Moreover, it is not possible with today's conventional hydrophone technology to detect the directions of the measured signals and this severely complicates possibilities for three-dimensional data recording.

DISCLOSURE OF INVENTION

The objective of the invention is to provide a new and improved device and method for recording three-dimensional pressure and shear waves which travel in the substratum.

The new and inventive features of the invention are disclosed in the characterizing part of the two main claims. Further advantageous features are disclosed in the dependent claims.

BRIEF DESCRIPTION OF DRAWINGS

The invention will be more closely described in the following, with reference to the accompanying drawings where.

MODES FOR CARRYING OUT THE INVENTION

Figure 1:
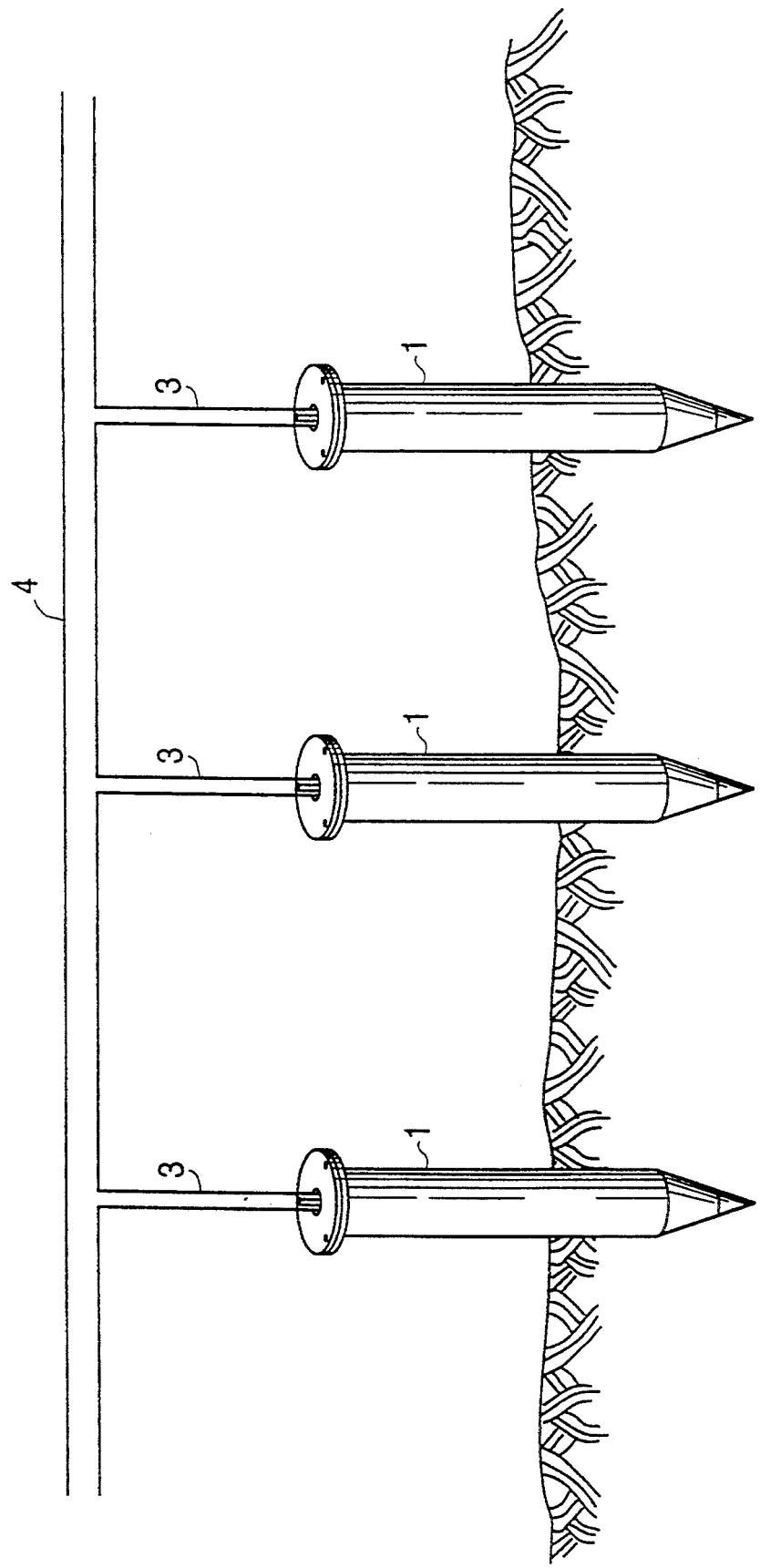
FIG. 1 illustrates poles containing seismic equipment and connected to a main cable.

In FIG. 1 poles 1 which are installed into the sea bed 2 are shown. The poles are, via branch cables 3, connected to a main cable 4 which extends to a seismic ship, for example a submarine or a surface vessel. Both the branch cables 3 and the main cable 4 will in a practical embodiment comprise a data cable and one or several pulling cables. The actual installation of the poles in the sea bed will be more closely described later.

Figure 2:
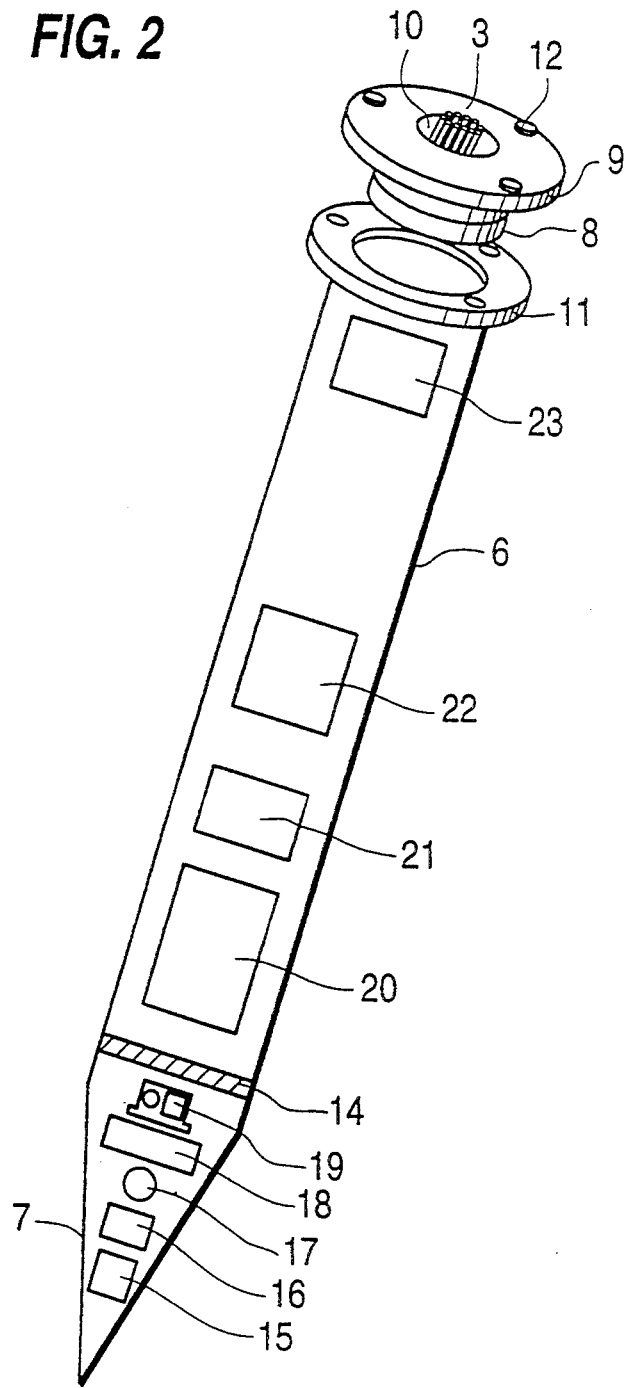
FIG. 2 shows a schematic outline of a pole.

In FIG. 2 a schematic embodiment of a pole is shown in larger scale, the pole comprising a cylindrical portion 6, a lower conically formed or pointed end 7 and an upper portion 8. The upper portion 8 is made to accommodate equipment for inserting the pole down into the sea bed. In the shown embodiment, the upper portion is designed with a flange portion 9, but other types of embodiment could also be used. This design is advantageous in that the flange 9 can be utilized as a striking organ for insertion of the pole into the sea bed. As will be seen in FIG. 2, the upper portion 8 also comprises a centrally situated output terminal 10 for the branch cable 3. The upper portion 8 is connected to a flange 11 on the cylindrical portion 6 of the pole by means of a threaded connection 12. The passage of the branch cable will be arranged so that it is watertight.

The pointed end 7 of the pole is insulated from the rest of the pole 1 by a vibration insulating spacer 14. In a preferred embodiment the spacer 14 is made of an elastomer.

The actual point is shown in FIG. 2 with a purely conical shape which makes it easier for the pole to penetrate the sea bed. Other forms of embodiment can also be used, for example a point divided into two with a lower cone ending in a shoulder and thereafter proceeding into a new cone portion as indicated in FIG. 1. Within the scope of the invention, other embodiments of the point can also be conceived.

The cylindrical portion 6 of the pole forms the main volume of the pole and contains a substantial amount of all the equipment. The actual pole should be made of a metal, for instance an aluminium alloy.

The pointed end of the pole comprises, in a preferred embodiment, three geophones 15–17 arranged three-dimensionally in an x, y and z direction. The geophones 15–17 are, as such, of a basically known type which is commercially available, and will therefore not be described further. It is important that the geophones 15–17 are given good contact with the pointed end 7 of the geo-pole and this can be achieved by the geophones 15–17 being fixed in the pointed end by means of a polymer material.

In the shown embodiment, an electric angle gauge 18 is placed in the pointed end 7, which angle gauge, based on the force of gravity provides the angle of the vertical axis of the pole. The pointed end comprises further a compass 19 where the rotation of the pole in the plane can be read. By means of these instruments, the exact direction of the pole can be determined, which is necessary in order to determine the orientation of reflected pressure and shear waves which are to be recorded. The compass 19 and the angle gauge 18 can also be placed in the cylindrical portion 6.

The cylindrical portion 6 of the pole contains the other equipment components. The arrangement of the various components is determined by several factors. One important factor is that the centre of gravity shall be as close as possible to the pointed end 7. It is also desirable that components which have direct contact with each other are localized close to each other.

In the shown embodiment, a battery 20 is placed at the bottom of the cylindrical portion, which can provide the other components with power. The preferable choice is Lithium batteries which are rechargeable. It is of course also possible to supply power to the various components via the main cable, but when there are many poles along a cable, unacceptable variations in voltage in the various poles could occur.

Above the battery, in a next unit, a processor 21 is placed which at least processes signals from the geophones 7–9 and from the electronic angle gauge 19/compass 18. The processor 21 is not a necessary part of the pole's equipment, since all signals could be sent unprocessed to the seismic ship and be processed in a central unit. But due to the enormous amounts of data which will accumulate when using many poles, it is preferable to undertake a pre-processing in each pole in order to reduce the amount of information transmitted from each pole. The pole comprises further a power supply unit 22 for distribution of power to the various units.

Upper unit in the pole comprises a hydrophone 23 which is a transducer for pressure waves. Pressure and shear waves which are reflected from the sediments are detected by the three-dimensional geophones mounted in the lower pointed end 7 of the pole, while the hydrophone 23 only detects pressure waves in the water layer. When recordings from the hydrophone and from the 3-D geophones 15–17 are correlated, and taking into account the distance between the hydrophone 23 and the geophones 15–17, it is possible to separate upwardly travelling, reflected pressure and shear waves from downwardly travelling pressure waves which are reflected from the sea surface.

Without it in any way being considered to be restrictive for the invention, typical dimensions for a pole could be a length of approximately 1 m and a diameter of approximately 10 cm.

The pole, when being used, is forced well into the sea bed so that the pointed part 7 shall achieve good contact with the formation. With the dimensions of the pole which are mentioned above, the pole will, typically, be forced approx. 20–40 cm down into the sea bed. The depth is moreover strongly dependent on the nature of the sea bed. Soft bed requires deeper penetration.

In the following, a preferred embodiment of utilization of several cable-connected poles during seismic exploration of the substratum offshore, will be described with reference to FIGS. 3 and 4.

Figure 3:
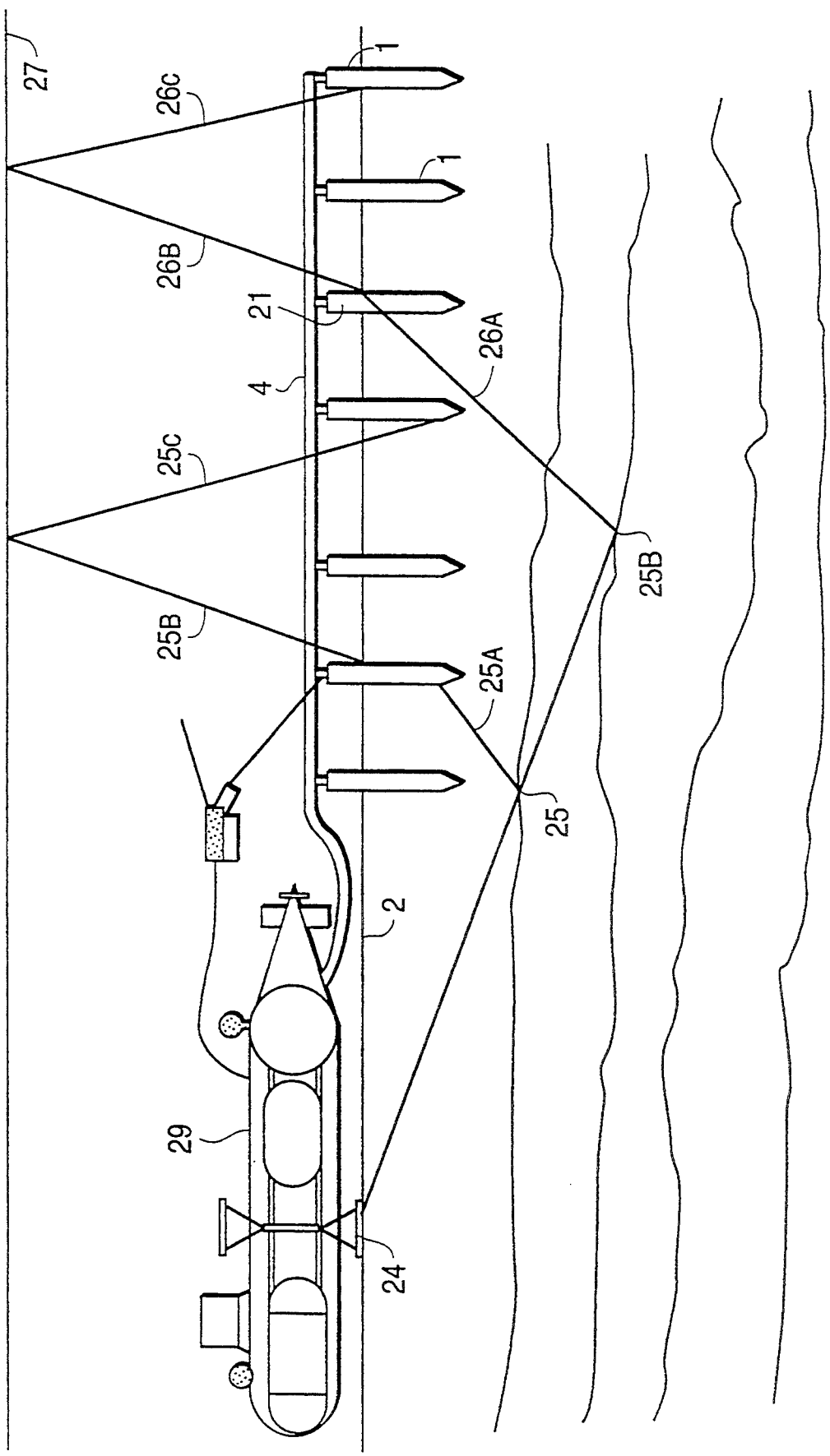
FIG. 3 illustrates an underwater vessel after laying out of cable poles on the sea bed, during execution of seismic exploration.

In a preferred embodiment, the poles as shown in FIG. 3 will prior to the exploration be inserted into the sea bed 2 by means of for example a remotely controlled underwater vessel 28. Each pole 1 is connected to a main cable 4 which extends to a seismic ship, illustrated in the figure as an underwater vessel 29.

In a practical embodiment it is quite possible that only a cable 4 will be used, but in most situations it will be preferable to use two or more parallel main cables 4. After the poles 21 are placed and forced down into the sea bed, the seismic exploration can begin.

The seismic ship will be provided with a source 24 for the generation of wave energy down into the formation in the vicinity of the poles 21. The wave energy source can come from many generators known, per se. An air cannon, which is the most usual source in marine surface seismology is suitable even although it generates "secondary sources" (bubble effects) which will increase with increasing sea depth. Explosive sources are another well-tried energy source which give very good results. The explosives can either be layed out on the sea bed or drilled a few meters down into the sea bed.

Using an underwater vessel 29, a marine sea bed vibrator 24 will be particularly advantageous. A modified version of existing vibrators can be used which are forced against the sea bed and function as land seismic vibrators in operation.

The advantage of placing a vibrator on the sea bed is that it is then possible to make a greater part of the energy penetrate down into the sea bed and moreover gives greater control and flexibility of the transmitted source signatures.

In the following a seismic exploration according to the invention will be more closely described.

A pressure wave or combined pressure and shear wave is generated from a source and propagates from the sea bed 2 and down into the substratum. In regions where there is division in acoustic impedance between the layers in the formation, for example the points 25 and 26, part of the energy will be reflected upwards as combined pressure and shear waves. They are indicated in FIG. 3 as wave 25a, 26a from the points 25 and 26 and the waves are detected by the poles' geophones and hydrophones. The shear waves do not travel in water and will cease at the sea bed 2, but the pressure waves will travel further upwards, illustrated in FIG. 3 as waves 25b, 26b which will reach the water surface 27 where a part of them will be reflected back to the sea bed as the waves 25c, 26c. The purpose of the poles' hydrophones together with the geophones is indeed to be able to detect downward reflection waves from the surface together with the upward reflection waves. By knowing the orientation and distance of depth between the geophones and hydrophones, it is possible to separate upward-travelling and downward-travelling waves.

Such a separation will be necessary because multiples or reflections from the sea surface will arrive at various points in time and will dominate the measurements more than in conventional collecting.

After the seismic ship has generated wave-energy from one position, the ship changes position (while the poles are in place) and generates new wave energy. The changing of position of the seismic ship each time wave energy is generated will take place in a pro-determined pattern. In order to achieve this, there is a certain length of cable on a reel.

Figure 4:
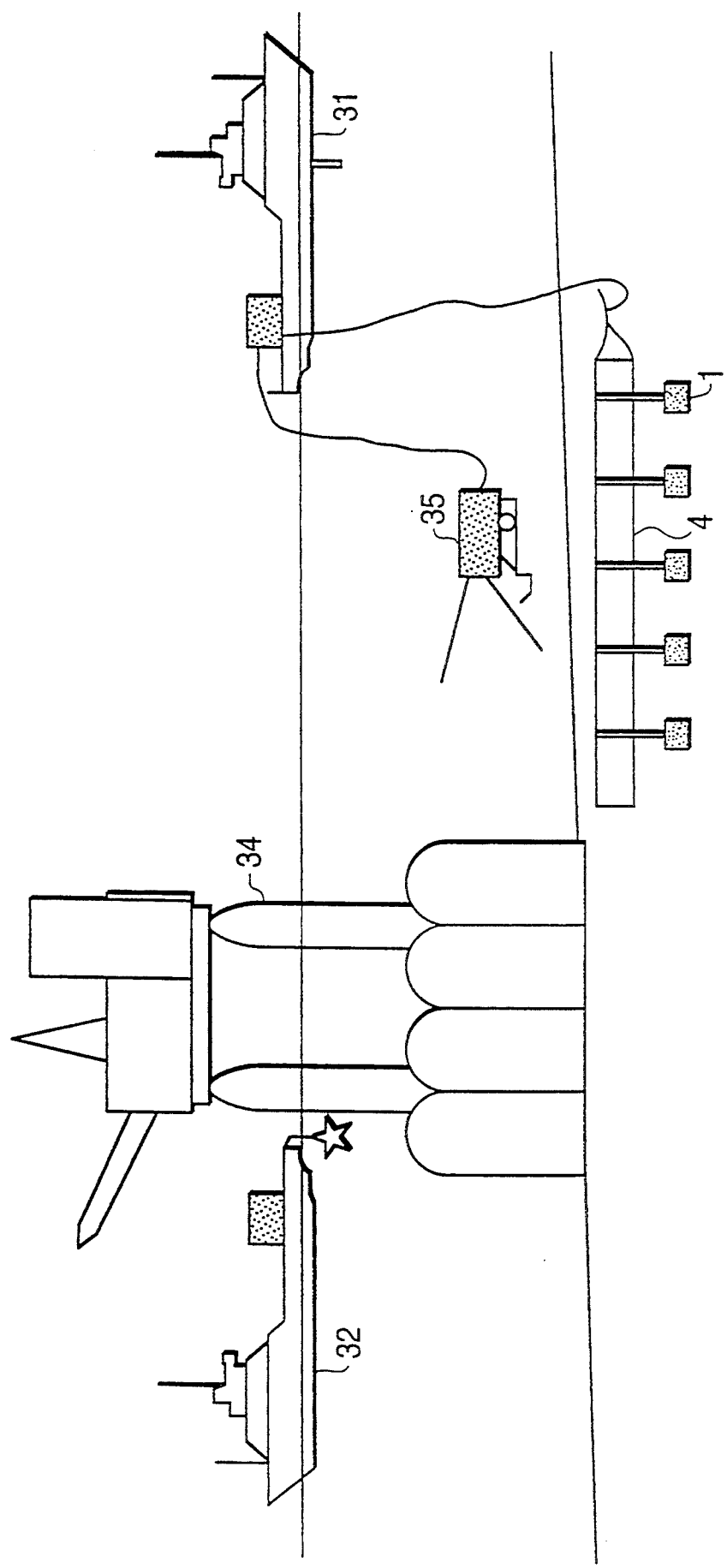
FIG. 4 illustrates a surface-controlled performance of a seismic survey.

In FIG. 4 there is an illustration of an equivalent seismic exploration by means of surface vessels where a first surface vessel 31 comprises the seismic ship which is connected to the main cable 4. A second surface vessel 32 generates pressure waves in various positions in relation to the poles of the main cable.

When the seismic exploration takes place in the vicinity of an off-shore installation where drilling is carried out, wave energy from the drilling will also be a potential source for seismic metering.

When using surface vessels for the execution of the seismic exploration, it will be easiest to us a ROV 35 to install the poles into the sea bed.

In FIG. 4 only one main cable 4, is shown, but it should be understood that also several parallel cables 4 and cables of various lengths can be feasible.

In FIG. 4 a hydrophone cable 33 is indicated which floats at a certain distance above and parallel to the main cable 4. This embodiment will be an alternative to having hydrophones placed in the upper portion of the pole. This is feasible because, amongst other things, this type of hydrophone cable is commercially available today.

We claim:

1. Device comprising instruments for collection and recording of signals in seismic exploration off-shore, in that the device is designed as a pole which is arranged so that it can be forced down into a sea bed and comprises a pointed lower end (7), an intermediate approximately cylindrically shaped main portion (6), in that the intermediate main portion's (6) upper end is connected to a top part (8) arranged for mounting and handling the device, in that the instruments measure both shear waves and pressure waves, and in that the device is connected to a main cable (4) which extends to a seismic ship (29, 31) characterised in that the pointed lower end comprises three geophones (15–17) arranged in mutually perpendicular directions, a hydrophone (23) is placed near the upper end of the device, it comprises an electronic angle gauge (19) which indicates the angle of the device with the vertical axis, it comprises a compass (18) which indicates the pole's rotation in the plane, the intermediate portion (6) comprises a processor (21) which at least processes signals from the geophones (15–17), the angle gauge (19), the compass (18) and the hydrophone (23).

2. Device according to claim 1, characterized in that it comprises a vibration absorbing spacer (14) between the pointed end (7) and the intermediate main portion (6) being made of an elastomer.

3. Device according to claim 1, characterized in that the device comprises a power-supply unit (22) for distribution of power to the various units.

4. Device according to claim 1, characterized in that a watertight outlet (10) for a branch cable (3) is arranged in the top part (8).

5. Device according to claim 1, characterized in that the upper portion of the pole is provided with a flange portion (9) arranged for depression of the pole into the sea bed and a lower flange (11) which functions as striking organ for pulling up the pole from the sea bed (2).

* * * * *